_United States Patent Office_

3,830,733
Patented Aug. 20, 1974

3,830,733
DIFFUSION MEMBRANES OF CONTROLLED
PERMEABILITY, APPARATUS AND PROCESS
Mark A. Spivack, Wachtung, Donald D. Stewart, South
Plainfield, and Frederick R. Tittmann, Plainfield, N.J.,
assignors to Union Carbide Corporation, New York,
N.Y.
Filed Mar. 9, 1972, Ser. No. 233,242
Int. Cl. B01d 31/00, 13/00
U.S. Cl. 210—22
30 Claims

ABSTRACT OF THE DISCLOSURE

Diffusion membranes of linear para-xylylene polymers having controlled permeability properties are prepared by condensing vaporous polymer forming diradicals with vaporous non-polymerizable filler materials, and then removing the condensed filler materials from the resulting membranes to provide the desired degree of permeability.

The membranes are used in apparatus and process for the separation of solids, liquids, gases and ions.

BACKGROUND OF THE INVENTION

(1) Field of the Invention

The invention relates to diffusion membranes of para-xylylene polymers.

(2) Description of the Prior Art

Linear para-xylylene polymers are usually prepared in the form of films which are transparent, smooth surfaced materials. These films, however, possess a relatively low permeability to moisture vapor and gases, such as oxygen, nitrogen and carbon dioxide. This tends to severely limit the utility of such films as permeable membranes for various types of applications.

Polymeric films made of linear para-xylylene polymers are usually prepared from a vaporous diradical which is condensed to form the polymer. The diradical is usually formed by pyrolyzing a cyclic xylylene dimer to yield two of the diradical units. The cyclic dimer is usually supplied to the pyrolysis zone, in which the dimer is pyrolyzed, as vapors from a vaporization zone in which the dimer is vaporized. It has been known that, when the dimer is incompletely pyrolyzed, so that vaporous dimer is present during the condensation of the vaporous diradical, the vaporous dimer is co-condensed with the diradical and becomes incorporated in the resulting film, and can be removed therefrom by extraction with a solvent therefor.

SUMMARY OF THE INVENTION

It has now been found that commercially useful diffusion membranes of linear para-xylylene polymers having enhanced permeability characteristics may be readily prepared by generating vapors of diradical precursors of such polymers and vapors of nonpolymer forming filler materials, and condensing such vapors to form such membranes, and then removing the filler materials from the membranes to provide the desired permeability properties.

An object of the present invention is to provide commercially useful diffusion membranes of linear para-xylylene polymers having enhanced permeability properties.

A further object of the present invention is to provide apparatus and process in which the para-xylylene diffusion membranes may be utilized.

DESCRIPTION OF THE PREFERRED EMBODIMENT

Figure 1:
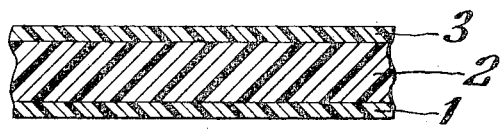
FIG. 1 shows a cross section of a membrane of para-xylylene polymer with a high content of filler material therein.

(1) The Process of the Present Invention

The diffusion membranes of linear para-xylylene polymers of the present invention are prepared, in accordance with the present invention, in, generally, a two step operation. In the first, or film forming operation, vapors of the diradicals and vapors of condensible, non-polymer forming, filler materials are generated and admixed, and then co-condensed under specific process conditions to form a polymeric film having a high content of the filler material. In the second, or membrane forming operation, the filler is removed from the film by evaporation, or by extraction with a suitable solvent therefor, to the extent necessary to provide a diffusion membrane having the desired degree of permeability.

(2) Film Forming Operation

2(A) Background—General preparation of para-xylylene polymers

Linear para-xylylene polymers are usually prepared by condensing, in a condensation zone, vapors of diradicals which can be produced by the pyrolytic cleavage, in a pyrolysis zone, of one or more cyclic dimers represented by the following structure:

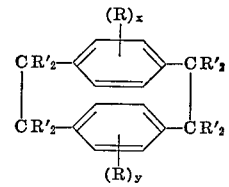

wherein R is an aromatic nuclear substituent, $x$ and $y$ are each integers from 0 to 3, inclusive, and R' is H, Cl and/or F. The thus formed vaporous diradicals have the structure:

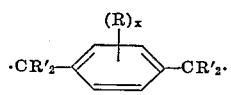

and

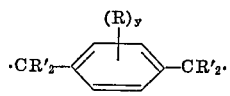

Thus, where $x$ and $y$ are the same, and the aromatic nuclear substituent on each diradical is the same, and all the R's are the same, two moles of the same p-xylylene diradical are formed, and when condensed, yield a substituted or unsubstituted p-xylylene homopolymer. When $x$ and $y$ are different or the aromatic nuclear substituents on each diradical are different, or the R's are different, condensation of such diradicals will yield copolymers as hereinafter set forth. Examples of the R substituent groups which may be present in the dimers and diradicals are organic groups such as alkyl, aryl, alkenyl, cyano, alkoxy, hydroxy alkyl, carbalkoxy and like radicals and inorganic radicals such as hydroxyl, halogen and amino groups. COOH, $NO_2$ and $SO_3H$ groups may be added as R groups to the polymer after it is formed. The unsubstituted positions on the aromatic rings are occupied by hydrogen atoms.

The particularly preferred substituent R groups are the $C_1$ to $C_{10}$ hydrocarbon groups, such as the lower alkyls, i.e., methyl, ethyl, propyl, butyl and hexyl, and aryl hydrocarbons such as phenyl, alkylated phenyl, naphthyl and like groups; and the halogen groups, chlorine, bromine, iodine and fluorine. Hereinafter the term "a di-p-xylylene" refers to any substituted or unsubstituted cyclic di-p-xylylene as hereinabove discussed.

Condensatoin of the diradicals to form the p-xylylene polymers can be accomplished at any temperature below the decomposition temperature of the polymer, i.e., at <250° C. The condensation of the diradicals will proceed at a faster rate, the colder is the substrate on which the condensation is to take place. Above certain temperatures, which might be defined as a ceiling condensation temperature, the diradicals will only condense at rates which are relatively slow for commercial applications. Each diradical has a different ceiling condensation temperature. For example, at 0.5 mm. Hg pressure the following condensation and polymerizations ceilings are observed for the following diradicals.

|  | Degrees centigrade |
|---|---|
| p-Xylylene | 25–30 |
| Chloro-p-xylylene | 70–80 |
| Cyano-p-xylylene | 120–130 |
| n-Butyl-p-xylylene | 130–140 |
| Iodo-p-xylylene | 180–200 |

Thus, homopolymers may be made by maintaining the substrate surface at a temperature below the ceiling condensation temperature of the particular diradical species involved, or desired in the homopolymer. This is most appropriately termed "homopolymerizing conditions."

Where several different diradicals existing in the pyrolyzed mixture have different vapor pressure and condensation characteristics as for example p-xylylene, or cyano-p-xylylene and chloro-p-xylylene, or any other mixture thereof with other substituted diradicals, homopolymerization will result when the condensation and polymerization temperature is selected to be at or below that temperature at which only one of the diradicals condenses and polymerizes. Thus, for the purpose of this invention the term "under homopolymerization conditions" is intended to include those conditions where only homopolymers are formed.

Therefore it is possible to make homopolymers from a mixture containing one or more of the substituted diradicals when any other diradicals present have different condensation or vapor pressure characteristics, and wherein only one diradical species is condensed and polymerized on the substrate surface. Of course, other diradical species not condensed on the substrate surface can be drawn through the apparatus as hereinafter described in vaporous form to be condensed and polymerized in a subsequent cold trap.

Inasmuch as p-xylylene diradicals, for example, are condensed at temperatures of about 25° to 30° C., which is much lower than that at which cyano p-xylylene diradicals condense, i.e., about 120° to 130° C., it is possible to have such p-xylylene diradicals present in the vaporous pyrolyzed mixture along with the cyano-substituted diradicals when a homopolymer of the substituted dimer is desired. In such a case, homo-polymerizing conditions for the cyan p-xylylene diradicals as secured by maintaining the substrate surface at a temperature below the ceiling condensation temperature of the substituted p-xylylene but above that of the unsubstituted p-xylylene, thus permitting the unsubstituted p-xylylene vapors to pass through the apparatus without condensing and polymerizing, but collecting the poly-p-xylylene in a subsequent cold trap.

It is also possible to obtain substituted copolymers through the pyrolysis process hereinabove described. Copolymers of p-xylylene and substituted p-xylylene diradicals, as well as copolymers of substituted p-xylylene radicals wherein the substituted groups are all the same radicals but wherein each diradical contains a different number of substituent groups, can all be obtained through such pyrolysis process.

Copolymerization also occurs simultaneously with condensation, upon cooling of the vaporous mixture of reactive diradicals to a temperature below about 200° C. under polymerization conditions.

Copolymers can be made by maintaining the substrate surface at a temperature below the ceiling condensation temperature of the lowest boiling diradical desired in the copolymer, such as at room temperature or below. This is considered "copolymerizing conditions," since at least two of the diradicals will condense and copolymerize in a random copolymer at such temperature.

2(B) Preparation of films with removable filler

In the film forming operation wherein the film is formed with a high content of the removable filler material, it is preferable that the vapour diradicals be formed, and the filler material be vaporized, concurrently, in the pyrolysis zone in which the cyclic dimers are pyrolytically cleaved to form the diradicals, so that the desired admixture of the vapors of these two materials can be readily accomplished with a minimum of process equipment. The filler material can also be vaporized in a separate vaporization zone and, either supplied as such to the pyrolysis zone for admixture there with the diradical vapors, or the filler material vapors can be admixed with the vaporous diradicals down-stream of the pyrolysis zone.

The physical admixture of the vapors of the two materials occurs homogeneously and automatically upon introducing one into the other.

Regardless of the procedure used for forming and mixing the vapors of these materials, for the purposes of the present invention, the admixed vapors should be prepared, and supplied to the condensation zone in which the filler enriched film is to be formed, so that the admixed vapors comprise 5 to 95% and preferably 10 to 90% by weight, of vaporous diradicals and 95 to 5% and prefarably 90 to 10% by weight of the vaporized filler, and so that the admixed vapors are supplied at a rate of feed, to the condensation zone, of about 0.01 to 100 grams per minute, and preferably of about 0.1 to 10 grams per minute.

The vaporization zone, pyrolysis zone, the condensation zone, and any zone therebetween which acts as a conduit zone for the passage of vapor therethrough, are maintained as an integrated closed system for the purposes of excluding deleterious materials therefrom, maintaining the desired operating conditions therein, and facilitating the desired generation, transport and condensation of the vaporous diradicals and fillers.

Since the composition of the admixed vapors is largely dependent upon the temperature, and residence time of the vapors, in the pyrolysis zone, it is desirable that the temperature in the pyrolysis zone be maintained, during the pyrolysis of the cyclic dimer, at a temperature of about 300 to 800° C., and preferably at a temperature of about 350 to 700° C.

For the same reasons, the mass flow rate of the dimer entering the pyrolysis zone from the dimer vaporization zone should be maintained, during the pyrolysis reaction, within the range of about 0.01 to 100 grams/minute, and preferably within the range of about 0.1 to 10 grams/minute.

The vaporizable filler materials which are to be used in the film forming operation have the following characteristics:

(a) they must be compounds which can be vaporized, or maintained as a vapor, under the pressure and temperature conditions used to vaporize the cyclic dimer in, and transport the vaporous diradical from, the pyrolysis zone;

(b) they must not be susceptible to polymerization or gross degradation under the pyrolysis and film forming conditions employed in the present invention;

(c) in condensed form, i.e. at the film forming conditions of temperature and pressure, they must be solid or liquid;

(d) they must be removable from the film of polymer in which they are condensed by evaporation or extraction with a solvent therefor, which solvent has the characteristics described below in the Membrane Forming Operation; and (e) they must be inert to the vaporous diradicals and to the condensed polymer.

In condensed form the filler materials will be of molecular size. Their sizes, therefore, will vary depending on the size of the molecules of the various compounds used as the filler.

One of the classes of compounds which may be employed as fillers are the cyclic para-xylylene dimers described above. Thus, the dimers from which the para-xylylene polymers are formed can also be used as the removable fillers. In one mode of operation, wherein a dimer is used in this way, the dimer is supplied to the pyrolysis zone in an amount that is in excess of that which can be pyrolytically cleaved under the set of operating conditions being employed in the pyrolysis zone. The dimer that is to be used as a filler in this operation can be the same as, or different than, the dimer which is to be used to form the polymer matrix of the film.

The excess dimer could also be vaporized outside of the pyrolysis zone and supplied thereto as such, or downstream of such zone, to be admixed with the vaporous diradicals.

Under normal pyrolysis conditions, i.e., of temperature and mass flow rate, only a certain amount of the cyclic dimers can be pyrolytically cleaved. These amounts will also vary depending on the particular dimer being used. Thus, a certain amount of experimentation is necessary in order to ascertain the pyrolysis conditions needed to provide the desired ratio of cleaved vaporous diradical and uncleaved vaporous dimer.

Other compounds which can be employed as the removable filler materials are hydrocarbon compounds such as naphthalene, anthracene, diphenyl, and substituted derivatives of such hydrocarbon compounds, such as, $\alpha$-chloro-naphthalene, dichlorobenzene, and the chlorinated diphenyl compounds which are sold under the trademark Aroclor and which contain about 21 to 62% by weight of chlorine and about 1 to 7 chlorine atoms per diphenyl molecule; and silicone oils.

In one mode of operation that may be employed for preparing films from which the diffusion membranes of the present invention may be formed, a composite film is first formed. Such a composite film is shown in FIG. 1 of the drawing. In this mode of operation a first thin stratum or zone 1 of para-xylylene polymer is formed. Stratum 1 is formed by condensing vapors which contain, essentially, only the polymer forming diradicals. This stratum is about 0.01 to 2, and preferably about 0.05 to 0.5, microns thick. It is essentially made of para-xylylene polymer, i.e., it contains less than 5% by weight of removable filler materials. Then a second stratum 2 is deposited on stratum 1. Stratum 2 is formed by co-condensing vapors of polymer forming diradicals and vapors of the filler materials. Stratum 2 is about 2 to about 10,000 times thicker than stratum 1, and stratum 2 contains about 5 to 95, and preferably 10 to 90% by weight of para-xylylene polymer, and about 95 to 5, and preferably 90 to 10% by weight of condensed filler material. Stratum 3 is deposited on stratum 2. Stratum 3 is made in the same way, and has the same characteristics, as stratum 1. Each of strata 1 and 3 provides a continuous outer surface.

Strata 1, 2 and 3 form a continuous polymeric matrix in which the removable filler is concentrated in strata 2. The fillers may be removed from the films of FIG. 1 by evaporation or by being extracted therefrom with a solvent therefor so as to provide the diffusion membrane of FIG. 2 which has the desired permeability characteristics.

(3) Membrane Forming Operation

The filler containing films are transparent to opaque materials, depending on the amount of filler which is present. The films must be subjected to an evaporation or solvent extraction operation in order to remove the filler therefrom and provide transparent to translucent diffusion membranes having the desired permeability properties. The evaporation process may be conducted at a temperature which is at or below the boiling point of the filler material, under atmospheric or reduced pressure conditions, and below the decomposition or degradation temperature of the polymeric matrix of the film being processed.

The solvent extraction is usually conducted at 0 to 150° C., and preferably at 25 to 100° C., for about 1 to 24 hours with an organic solvent for the filler. The solvent should also be inert to the film matrix, that is, it should not dissolve the film matrix, nor react with it under the extraction conditions employed.

Solvents for the fillers which may be used include aromatic hydrocarbon materials such as benzene, toluene and xylene, halogenated aliphatic materials such as methylene chloride, chloroform and carbon tetrachloride, and ethers such as dimethyl formamide or tetrahydrofuran.

The solvent extracted membranes should be dried to remove the solvent therefrom. The drying can be done in air or under vacuum.

The amount of filler added to the film and/or removed therefrom can be varied so as to vary the permeability characteristics of the resulting diffusion membranes.

The fillers can be recovered from the extracting solvents, or from the evaporating device employed, and reused in subsequent film forming operations. This is desirable where the fillers are the cyclic dimers.

Although the unfilled para-xylylene film matrices are generally relatively impermeable to solvents at 25° C. it is still possible to extract the fillers from such matrices under such conditions because the films are relatively thin, and the fillers are solvent soluble.

Figure 2:
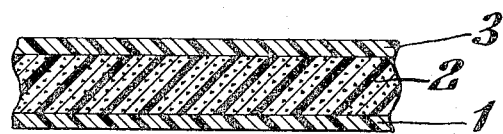
FIG. 2 shows a cross section of the membrane of FIG. 1 with the filler material removed.

One of the reasons, therefore, for keeping film stratum 1 and 3 relatively thin, as shown in FIGS. 1 and 2, is to allow solvent for the filler ready access to the filler laden stratum 2. The thinness of the composite membrane also enhances the permeable characteristics of the membrane.

After the removal of the filler, the stratum of film which had the filler removed therefrom is a porous stratum, as shown by stratum 2 in FIG. 2. The porous stratum imparts essentially all of the desired gas permeability characteristics to the membrane, whether the membrane consists only of such a porous stratum, or is a composite type membrane as shown in FIG. 2, which has a porous stratum 2 sandwiched between two outer, non-porous strata 1 and 3. A composite film may also be prepared in which only one of strata 1 and 3 is used with a stratum 2.

(4) The Diffusion Membrane

The diffusion membranes which are prepared in accordance with the present invention may be prepared so as to provide membranes with total thicknesses of about 0.05 to 1000 microns.

The diffusion membranes of the present invention provide at least a 2 to 1000 fold improvement in gas diffusion properties, as contrasted to the gas diffusion properties of films made entirely, or substantially, of unfilled para-xylylene polymer. Examples of these improved properties are shown by a comparison of the properties of five various membranes in the following Table I. The membranes compared in this regard were all essentially composed of a porous strata 2 of polymeric matrix. Each film was made by pyrolyzing the dimer in question and condensing it to form a film as disclosed in Examples I–V below, respectively.

Film No. 1 was made with less than 1% by weight of extractable dimer as a filler and it had poor gas diffusion properties. Films Nos. 2 to 5 were made with 12 to 43% by weight of extractable dimer as a filler and they had good to excellent gas diffusion properties. The filler used in films 1–5 was an excess of the dimer from which the polymeric matrix was formed.

TABLE I

| Membranes made from— | Thickness of film, microns | Percent by weight of extractables in film [a] | Nature of extractable | Permeability constant of film for— | | |
|---|---|---|---|---|---|---|
| | | | | $N_2$ [b] | $CO_2$ [b] | $H_2O$ [c] |
| 1. Poly-chloro-para-xylylene. | 25 | 1.0 | Di-Cl-di-paraxylylene. | 0.6 | 7.2 | 0.7 |
| 2. do | 18 | 13 | do | 1.4 | 17.2 | |
| 3. do | 22 | 12 | do | 3.8 | 29.9 | |
| 4. do | 17 | 40 | do | 1.0 | 42.5 | |
| 5. do | 25 | 43 | do | | | 33 |

[a] Percent extractables in boiling benzene for 2 hours at 75° C.
[b] ASTM D-1434-63T—constant reported at 23° C. as cc.·mil/100 square inches in 24 hours per atmospheric pressure.
[c] ASTM E-96-63T—constant reported at 37° C. as gram·mil/100 square inches in 24 hours at 90% relative humidity.

The preferred membranes are those made of polymer formed from the unsubstituted dimer, di-para-xylylene, and the chlorinated substituted dimer, dichlorodiparaxylylene, and the dimer in which R is H and R' is F, as shown in the structure above, i.e., α-octa fluoro diparaxylylene.

The para-xylylene polymers of the present invention generally have nitrogen permeability constants of >0.6 cc. mil/100 square inches in 24 hours per atmosphere of pressure, and carbon dioxide permeability constants of >6 cc. mil/100 square inches in 24 hours per atmosphere of pressure.

The preferred membranes of poly(para-xylylene) i.e., made from unsubstituted di-para-xylylene, have a nitrogen permeability constant (at 23° C.) of at least 8, and preferably of about 16 to 8000 cc. mil/100 square inches in 24 hours per atmospheric pressure, and a carbon dioxide permeability constant (at 23° C.) of at least 215, and preferably of about 430 to 215,000, cc. mil/100 square inches in 24 hours per atmospheric pressure. These membranes preferably also have moisture vapor transmission constants or values (at 37° C. and 90% RH) of at least 1.5 and preferably of 3 to 1500 gram mils/100 in.$^2$ 24 hours.

The preferred membranes of poly(Cl-p-xylylene) have an nitrogen permeability constant (at 23° C.) of at least 1, and preferably of about 2 to 1000, cc. mil/100 square inches in 24 hours per atmospheric pressure, and a carbon dioxide permeability constant (at 23° C.) of at least 7.5, and preferably of about 15 to 7500, cc. mil/100 square inches in 24 hours per atmospheric pressure. These membranes preferably also have moisture vapor transmission constants or values (at 37° C. and 90% RH) of at least 0.6 and preferably of 1.2 to 600 gram mils/100 in.$^2$·24 hours.

The diffusion membranes of the present invention are porous and are transparent to translucent, and have pores therein which are essentially the size of the molecules of the fillers that were removed therefrom. The size of the pores can thus be varied by using fillers having different molecular dimensions. The pores in the membranes allow for the preferential transport through the membranes of gaseous, liquid or ionic species. The diffusion membranes are useful therefore in apparatus designed for the separation of liquids from liquids, liquids from solids, gases from gases, gases from liquids, ions from ions and ions from liquids. Such apparatus may be used therefore in gaseous diffusion separation processes, reverse osmosis processes, chemical separation processes, blood oxygenation processes and kidney fluid separation processes.

The apparatus of the present invention, which employ the diffusion membranes of the present invention therein, have the following advantages, as compared to apparatus using other types of porous membranes therein:

(a) they can be used for the treatment of a substantially large volumes of materials therein since the para-xylylene membranes are inert to most chemicals and gases;
(b) they can be used in a substantially more reliable and dependable fashion because the para-xylylene membranes are pin hole free;
(c) they can be used over a substantially wider range of operating conditions since the para-xylylene membranes have good low temperature and high temperature properties;
(d) they are substantially more efficient in processing large volumes of materials therein since the para-xylylene membranes are very thin and allow for substantially higher absolute transport rates therethrough;
(e) they can be engineered into complex and intricate design shapes since the para-xylylene membranes can be readily and evenly applied to any such configuration, and;
(f) an apparatus of one design can be used to process a number of different types of materials therein because various degrees of permeability can be readily provided by the use of different para-xylylene membranes therein, which membranes may have the same thicknesses, and area configurations, but substantially different permeability characteristics.

(5) Examples

The following examples are merely illustrative of the present invention and are not intended as a limitation upon the scope thereof.

EXAMPLE I–V

The five membranes having the properties disclosed above in Table I were prepared in these examples.

In each example a film was first prepared which had unpolymerized dimer therein as the filler. Each of the films were prepared by vaporizing a charge of about 100 grams of dichloro di-p-xylylene at a temperature of about 180 to 300° C. The system was evacuated to a pressure of less than 100 millitorr. The dimer vapors were then passed thru a pyrolysis zone which was heated at about 630 to 660° C. The dimer vapors were thus caused to pass through the pyrolysis zone at the rate of about 1.5 to 7 grams/minute. In each case a portion of the dimer passed through the pyrolysis zone without being pyrolyzed into the corresponding diradical. The diradical vapors and dimer vapors, which were admixed were then passed into a deposition zone (12" in diameter x 30" long) and codeposited on 8" x 8" glass plates. The plates were at a temperature of about 25° C. The diradical vapors polymerized into a film of poly(chloro-p-xylylene) which was about 25μm. thick, and in which the unreacted dimer was embedded. The pressure in the system was then raised to atmospheric pressure and the films were mechanically removed from the glass substrates.

The films were weighed and then immersed in benzene at 75° C. for 2 hours. The films were then washed with fresh benzene and dried in a vacuum oven, set at 80° C. for 24 hours. The dried films were then weighed to ascertain the amount of dimer removed therefrom by the benzene.

Table II below lists, with respect to each of the five films thus prepared, the vaporization temperature and pyrolysis temperature used, and the rate of feed of dimer into the pyrolysis zone.

TABLE II

| Film number: | Vaporization temperature, ° C. | Pyrolysis temperature, ° C. | Dimer feed, grams/minute |
|---|---|---|---|
| 1 | 180 | 660 | 1.5 |
| 2 | 250 | 660 | 4.5 |
| 3 | 230 | 660 | 4 |
| 4 | 300 | 640 | 7 |
| 5 | 300 | 630 | 7 |

EXAMPLE VI

A 3" x 3" section of stainless steel woven 400 mesh screen was placed in the deposition chamber of a paraxylylene coating unit. The deposition chamber was a tube which was nine inches in diameter and nine inches long. About 15 grams of dichloro di-p-xylylene dimer was placed in the vaporization chamber of the coating unit and the unit was evacuated, to lower the pressure therein, with a 15 c.f.m. mechanical pump. The pyrolysis furnace, which was downstream of the dimer vaporization chamber, was heated to 680° C. and when the base pressure of about 5 millitorr was reached in the coating unit the dimer was heated to 170° C. in the vaporization chamber which caused the dimer to vaporize at the rate of about 0.3 grams per minute. The vaporized dimer was then passed through the pyrolysis furnace and the pyrolyzed dimer was then passed into a deposition chamber where it condensed on, and completely coated, the mesh screen with a film of poly(chloro-p-xylylene) which was about 8 μm. thick. The coated screen was then recovered from the deposition chamber. This coated mesh is designated as Screen A.

In a second coating operation, a second 3" x 3" section of stainless steel woven 400 mesh screen was also completely coated with a film of poly(chloro-p-zylylene) as disclosed above, with the following exceptions: the pyrolysis furnace was heated to 475° C. and the dimer was vaporized in the vaporization chamber at 200° C. which produced a vaporization rate of about 0.5 grams per minute. The mesh was coated with a film of polymer which was about 8 μm. thick. This coated mesh is designated as Screen B.

Screens A and B were then placed in a vacuum oven under a base pressure of about 10 millitorr at a temperature of about 120° C. for 18 hours. Weighings made on Screens A and B before and after this heat treatment indicated that Screen A suffered a weight loss of less than 2% of its original weight, and that Screen B suffered a weight loss of about 20% during the heat treatment. The loss in weight in the two screens was due to the evaporation therefrom, during the heat treatment, of filler material in the form of unpolymerized, condensed, dimer. The evaporation of the dimer from the coating on Screen B produced a porous, permeable coating on Screen B. The coating on Screen A was virtually unchanged by the evaporation operation.

Following the heat treatments, Screens A and B were then immersed in an etching bath (30% aqueous ferric chloride). Within one week, the stainless steel mesh in Screen B had been completely etched away by the action of the etchant, whose ions had permeated the porous poly(chloro-p-xylylene) coating of Screen B. The porous coating of Screen B was inert to the etchant. After two months in the same etching bath, no visible etching of the mesh in Screen A had taken place.

The membranes used for the two screens were each essentially composed of a porous strata 2 of polymeric matrix.

What is claimed is:

1. In an apparatus employing a diffusion membrane for the separation of spicies selected from the group consisting of liquids, gases, solids and ions, the improvement comprising, as said membrane, a porous linear para-xylylene polymer.

2. An apparatus as in claim 1 in which said membrane is 0.05 to 1000 microns thick.

3. An apparatus as in claim 2 in which said polymer consists of a plurality of recurring units of the structures:

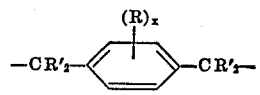

and

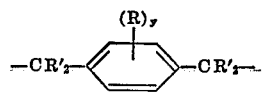

wherein the Rs are the same or different aromatic nuclear substituents, $x$ and $y$ are each integers of 0 to 3, inclusive, and the R's are the same or different and are H, Cl or F.

4. An apparatus as in claim 3 in which the R's are H.

5. An apparatus as in claim 4 in which $x$ and $y$ are 0.

6. An apparatus as in claim 4 in which $x$ and $y$ are 1.

7. An apparatus as in claim 6 in which the Rs are selected from the group consisting of alkyl, aryl, alkenyl, cyano, COOH, $NO_2$, $SO_3H$, alkoxy, hydroxyalkyl, carbalkoxy, hydroxyl, halogen and amine groups.

8. An apparatus as in claim 7 in which the Rs are halogen groups.

9. An apparatus as in claim 8 in which the Rs are Cl.

10. An apparatus as in claim 2 in which said membrane has a nitrogen permeability constant of >0.6 cc. mil/100 square inches in 24 hours per atmosphere of pressure and a carbon dioxide permeability constant of >6 cc. mil/100 square inches in 24 hours per atmosphere of pressure.

11. In a process for separating species selected from the group consisting of liquids, gases, solids and ions by means of a diffusion membrane, the improvement which consists of, employing as said membrane, a porous membrane of para-xylylene polymer.

12. A process as in claim 11 in which said membrane is 0.05 to 1000 microns thick.

13. A process as in claim 12 in which said polymer consists of a plurality of recurring units of the structure

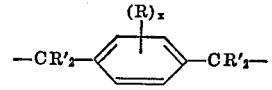

and

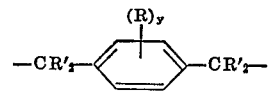

wherein the Rs are the same or different aromatic nuclear substituents, $x$ and $y$ are each integers of 0 to 3, inclusive, and the R's are the same or different and are H, Cl or F.

14. A process as in claim 13 in which the R's are H.

15. A process as in claim 14 in which $x$ and $y$ are 0.

16. A process as in claim 14 in which $x$ and $y$ are 1.

17. A process as in claim 16 in which the Rs are selected from the group consisting of alkyl, aryl, alkenyl, cyano, COOH, $NO_2$, $SO_3H$, alkoxy, hydroxyalkyl, carbalkoxy, hydroxyl, halogen and amino groups.

18. A process as in claim 17 in which the Rs are halogen groups.

19. A process as in claim 18 in which the Rs are Cl.

20. A process as in claim 12 in which said membrane has a nitrogen permeability constant of >0.6 cc. mil/

100 square inches in 24 hours per atmosphere of pressure and a carbon dioxide permeability constant of >6 cc. mil/100 square inches in 24 hours per atmosphere of pressure.

21. A porous membrane of para-xylylene polymer adaptable for use in a diffusion apparatus as a means for the separation of species selected from the group consisting of liquids, gases, solids and ions.

22. A membrane of para-xylylene polymer as in claim 19 having an nitrogen permeability constant of >0.6 cc. mil/100 square inches in 24 hours per atmosphere of pressure and a carbon dioxide permeability constant of >6 cc. mil/100 square inches in 24 hours per atmosphere of pressure.

23. A membrane as in claim 22 which is 0.05 to 1000 microns thick.

24. A membrane as in claim 23 wherein the polymer consists of a plurality of recurring units having the structure

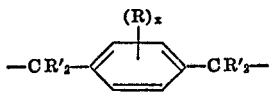

and

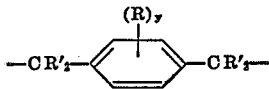

wherein the Rs are the same or different aromatic nuclear substituents, $x$ and $y$ are each integers of 0 to 3, inclusive, and the R's are the same or different and are H, Cl or F.

25. A membrane as in claim 24 in which the R's are H.
26. A membrane as in claim 25 in which $x$ and $y$ are 0.
27. A membrane as in claim 25 in which $x$ and $y$ are 1.
28. A membrane as in claim 27 in which the Rs are selected from the group consisting of alkyl, aryl, alkenyl, cyano, COOH, $NO_2$, $SO_3H$, alkoxy, hydroxyalkyl, carboalkoxy, hydroxyl, halogen, and amino groups.
29. A membrane as in claim 28 in which the Rs are halogen groups.
30. A membrane as in claim 29 in which the Rs are Cl groups.

References Cited
UNITED STATES PATENTS

| | | | |
|---|---|---|---|
| 3,472,795 | 10/1969 | Tittmann et al. | 260—2 H |
| 3,709,774 | 1/1973 | Kimura | 55—16 X |
| 3,350,844 | 11/1967 | Rubb | 55—16 |
| 3,657,113 | 4/1972 | Stancell et al. | 210—490 X |
| 3,662,046 | 5/1972 | Woo et al. | 210—500 X |

FRANK A. SPEAR, JR., Primary Examiner

U.S. Cl. X.R.

55—16; 210—23, 321, 500